United States Patent

Harada

(10) Patent No.: US 10,937,149 B2
(45) Date of Patent: Mar. 2, 2021

(54) NON-TRANSITORY COMPUTER-READABLE STORAGE MEDIUM FOR STORING COMPARISON PROGRAM, COMPARISON DEVICE, AND COMPARISON METHOD

(71) Applicant: FUJITSU LIMITED, Kawasaki (JP)

(72) Inventor: Kazuyuki Harada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 296 days.

(21) Appl. No.: 15/962,142

(22) Filed: Apr. 25, 2018

(65) Prior Publication Data
US 2018/0330485 A1    Nov. 15, 2018

(30) Foreign Application Priority Data

May 11, 2017    (JP) .............................. JP2017-094582

(51) Int. Cl.
*G06T 7/00* (2017.01)
*G06T 7/254* (2017.01)

(52) U.S. Cl.
CPC .............. *G06T 7/001* (2013.01); *G06T 7/254* (2017.01); *G06T 2207/30168* (2013.01)

(58) Field of Classification Search
CPC ........................ G06T 7/001; G06T 2207/30168
See application file for complete search history.

(56) References Cited

U.S. PATENT DOCUMENTS

| 9,501,719 | B1* | 11/2016 | Horovitz | G06K 9/685 |
| 2007/0201085 | A1* | 8/2007 | Yokochi | G03G 21/046 |
| | | | | 358/1.15 |
| 2010/0027042 | A1 | 2/2010 | Ikuno | |
| 2014/0212014 | A1* | 7/2014 | Kim | G06T 3/0068 |
| | | | | 382/131 |

FOREIGN PATENT DOCUMENTS

| JP | 2001-103224 A | 4/2001 |
| JP | 2010-41111 A | 2/2010 |

* cited by examiner

*Primary Examiner* — Kevin Ky
(74) *Attorney, Agent, or Firm* — Westerman, Hattori, Daniels & Adrian, LLP

(57) ABSTRACT

A comparison apparatus includes: a memory configured to store instructions; and a processor configured to execute the instructions stored in the memory, the instructions causing the processor to execute a comparison process including: acquiring a plurality of images sequentially displayed on a display unit according to a display instruction regarding a specific content, the plurality of images including a first image and a second image acquired after acquiring the first image; when the second image of which a degree of coincidence with the first image satisfies a criterion, performing a first comparison that includes comparing a reference image associated with the display instruction and at least either one of the first image or the second image; and outputting a result of the first comparison.

12 Claims, 21 Drawing Sheets

FIG. 16

| ITEM NUMBER | ACQUISITION TIME (SEC) |
|---|---|
| 1 | 0.01 |

FIG. 17

| ITEM NUMBER | TIMEOUT TIME (SEC) |
|---|---|
| 1 | 10 |

NON-TRANSITORY COMPUTER-READABLE STORAGE MEDIUM FOR STORING COMPARISON PROGRAM, COMPARISON DEVICE, AND COMPARISON METHOD

CROSS-REFERENCE TO RELATED APPLICATION

This application is based upon and claims the benefit of priority of the prior Japanese Patent Application No. 2017-094582, filed on 11 May 2017, the entire contents of which are incorporated herein by reference.

FIELD

The embodiments discussed herein are related to a non-transitory computer-readable storage medium for storing a comparison program, a comparison device, and a comparison method.

BACKGROUND

For example, a business operator that provides a service to a user (hereinafter, also simply referred to as a business operator) constructs and operates a business system (hereinafter also referred to as information processing system) for providing a service. In a case where the business operator generates a program constituting a business system, the business operator performs various tests on the operation of the generated program.

Specifically, the program generated by the business operator includes, for example, a program for displaying a screen to be viewed by a user who receives the service at the time of execution of the program (hereinafter, also referred to as a screen display program). In a case where the business operator generates the screen display program, the business operator performs a test for confirming that the screen is displayed as expected by the business operator (hereinafter, also referred to as a screen confirmation test), for example.

Examples of the related art include Japanese Laid-open Patent Publication Nos. 2010-041111 and 2001-103224.

SUMMARY

According to an aspect of the invention, a comparison apparatus includes: a memory configured to store instructions; and a processor configured to execute the instructions stored in the memory, the instructions causing the processor to execute a comparison process including: acquiring a plurality of images sequentially displayed on a display unit according, to a display instruction regarding a specific content, the plurality of images including a first image and a second image acquired after acquiring the first image; when the second image of which a degree of coincidence with the first image satisfies a criterion, performing a first comparison that includes comparing a reference image associated with the display instruction and at least either one of the first image or the second image; and outputting a result of the first comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a diagram illustrating a specific example of acquisition interval information;

FIG. 17 is a diagram illustrating specific example of timeout information;

DESCRIPTION OF EMBODIMENTS

Figure 1:
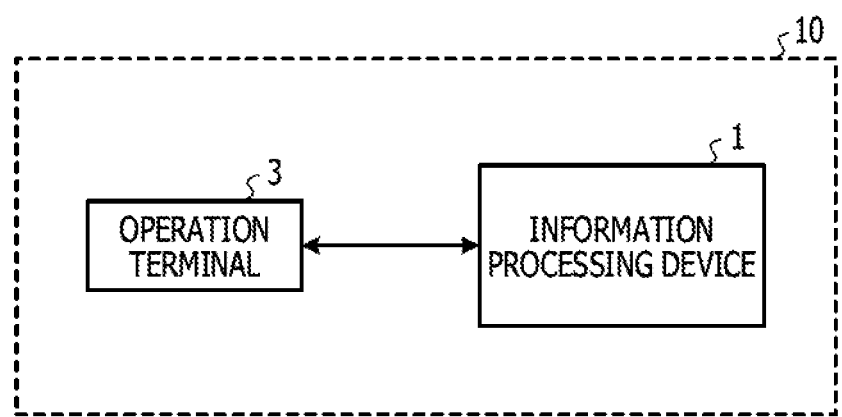
FIG. 1 is a diagram illustrating an overall configuration of an information processing system.

As described above, the conventional screen confirmation test has to be performed by an image corresponding to a screen on which display is completed (hereinafter, also referred to as a stable image). Therefore, a person in charge who performs the test (hereinafter, also referred to as a person in charge of the test) is forced to do a series of works such as visually confirmation of each screen displayed by a screen display program or specification of the stable image corresponding to each screen. Through these series of works, a typical person in charge of the test can perform a screen verification test by using stable images corresponding to each screen.

However, the number of screens displayed by the screen display program can be enormous depending on contents of a service provided to a user. Therefore, in a case where the number of screens to be confirmed becomes enormous, the person in charge of the test becomes difficult to perform the screen confirmation test on all the screens displayed by the screen display program.

Therefore, a person in charge who develops the program (hereinafter, also referred to as a person in charge of development) can, for example, incorporate processing for automatically acquiring a stable image corresponding to each screen with respect to the screen display program. For example, the person in charge of development may specify the image corresponding to the screen after a predetermined period of time (hereinafter, also referred to as a standby time) is elapsed from a start of display of each screen as the stable image and incorporate processing for acquiring the specified image into the screen display program.

Accordingly, the person in charge of the test can acquire the stable image corresponding to each screen without visually confirming the screen.

However, the time for from when the display of each screen is started until the stable image corresponding to each screen can be acquired (hereinafter, also referred to as an acquisition turnaround time) differs for each screen displayed by the screen display program in some cases. Therefore, for example, in a case where there is a screen in which the acquisition turnaround time is longer than the standby time, the image automatically acquired by the screen display program every time a uniform waiting time elapses is displayed on the screen before the display is completed (an image that is not the stable image) may be included.

Accordingly, in the screen confirmation test, even in a case where the person in charge of the test detects that an abnormality is present in the acquired image, it is difficult to easily determine whether the cause of the detected abnormality is due to a defect in the screen display program, or whether the displayed screen is due to not being a stable image. As a result, the person in charge of the test may forcibly confirm the screen by visual inspection, and the screen confirmation test is difficult to be performed efficiently in some cases.

According to one aspect of the present disclosure, provided are technologies for efficiently enabling of performing a test for confirming the displayed screen.

Configuration of Information Processing System

FIG. 1 is a diagram illustrating an overall configuration of an information processing system 10. The information processing system 10 illustrated in FIG. 1 includes an information processing device 1, and an operation terminal 3.

The information processing device 1 (a CPU of the information processing device 1) executes, for example, a screen display program for displaying a screen to be viewed by a user who receives a service. Specifically, the information processing device 1 executes the screen display program according to the reception of an execution instruction of the screen display program from the operation terminal 3, for example. In accordance, with the execution of the screen display program, the information processing device displays a screen on a display device (not illustrated) of the operation terminal 3 that transmitted the execution instruction, for example.

Accordingly, the person in charge of the test can perform the screen confirmation test via the display device of the operation terminal 3, for example.

In the screen confirmation test as described above, for example, the stable image corresponding to the screen on which display is completed on the display device of the operation terminal 3 is compared with, a correct image prepared in advance by a business operator (hereinafter, also referred to as a reference image). Therefore, the person in charge of the test visually confirms each screen displayed by the screen display program and specifies the stable image corresponding to each screen, for example. Accordingly, the person in charge of the test can perform the screen confirmation test with the stable image corresponding to each screen.

However, there are cases where the number of screens displayed by the screen display program is enormous depending on the contents of services provided to the user. Therefore, in this case, it is difficult for the person in charge of the test to perform the screen confirmation test on all the screens displayed by the screen display program.

Therefore, for example, the person in charge of development incorporates processing of automatically acquiring the stable image corresponding to each screen with respect to the screen display program. Specifically, the person in charge of development specifies the image corresponding to the screen after the waiting time is elapsed as a stable image, and incorporates the processing of acquiring the specified image into the screen display program. A specific example of the stable image acquired by the screen display program will be described below.

Specific Example of Stable Image Acquired by Screen Display Program

Figure 2:
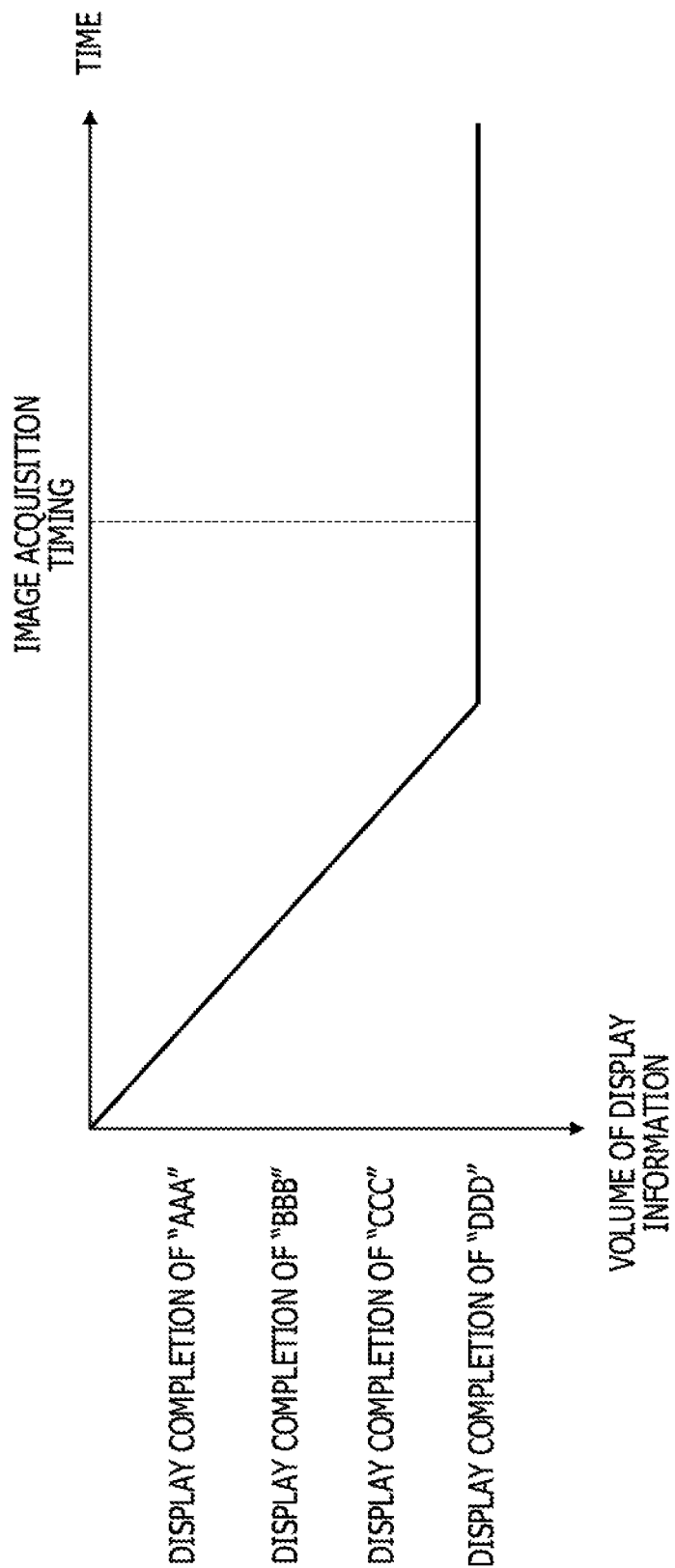
FIG. 2 is a diagram illustrating a specific example of a stable image acquired by a screen display program.
Figure 3:
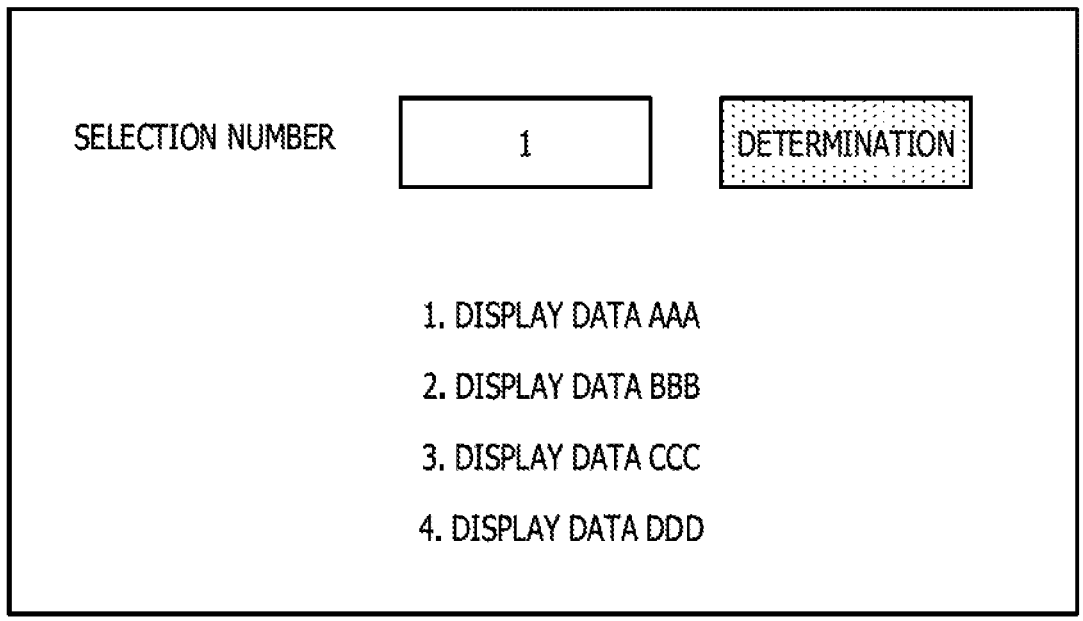
FIG. 3 is a diagram illustrating a specific example of the stable image acquired by the screen display program.

FIGS. 2 and 3 are diagrams illustrating a specific example of the stable image acquired by the screen display program. Hereinafter, after "1" is input as "selection number", "1. display data AAA", "2. display data BBB", "3. display data CCC" and "4. display data DDD" are displayed as an example. In addition, hereinafter, "1. display data AAA", "2. display data BBB", "3. display data CCC" and "4. display data DDD" are simply expressed as "AAA", "BBB", "CCC", and "DDD", respectively.

The graph illustrated in FIG. 2 is a graph illustrating a relationship between the timing (hereinafter also referred to as "display completion timing") at which display of "AAA", "BBB", "CCC" and "DDD" is completed on a screen where the acquisition turnaround time is shorter than the standby time and the timing at which the image is acquired by the screen display program (hereinafter, also referred to as an image acquisition timing). In the graph illustrated in FIG. 2, a horizontal axis represents a time and a vertical axis represents a volume of information that is desired to be displayed in order to display the screen.

Specifically, in the graph illustrated in FIG. 2, the image acquisition timing is the timing after the display completion timing of "AAA", "BBB", "CCC" and "DDD". Therefore, in this case, as illustrated in FIG. 3, the information processing device (for example, the information processing device 1) executing the screen display program can acquire the image (the stable image) in which displays all of "AAA", "BBB", "CCC", and "DDD" are completed. Therefore, in this case, for example, the person in charge of the test can acquire the stable image corresponding to each screen without visually confirming the screen.

However, the acquisition turnaround time corresponding to each screen may be different for each screen displayed by the screen display program. Therefore, for example, in the case where there is a screen of which the acquisition turnaround time is longer than the standby time, there is a possibility that the image automatically acquired by the screen display program includes an image that is not a stable image (an image corresponding to a screen before completion of display). Hereinafter, the specific example of the image that is not the stable image acquired by the screen display program will be described below.

Figure 4:
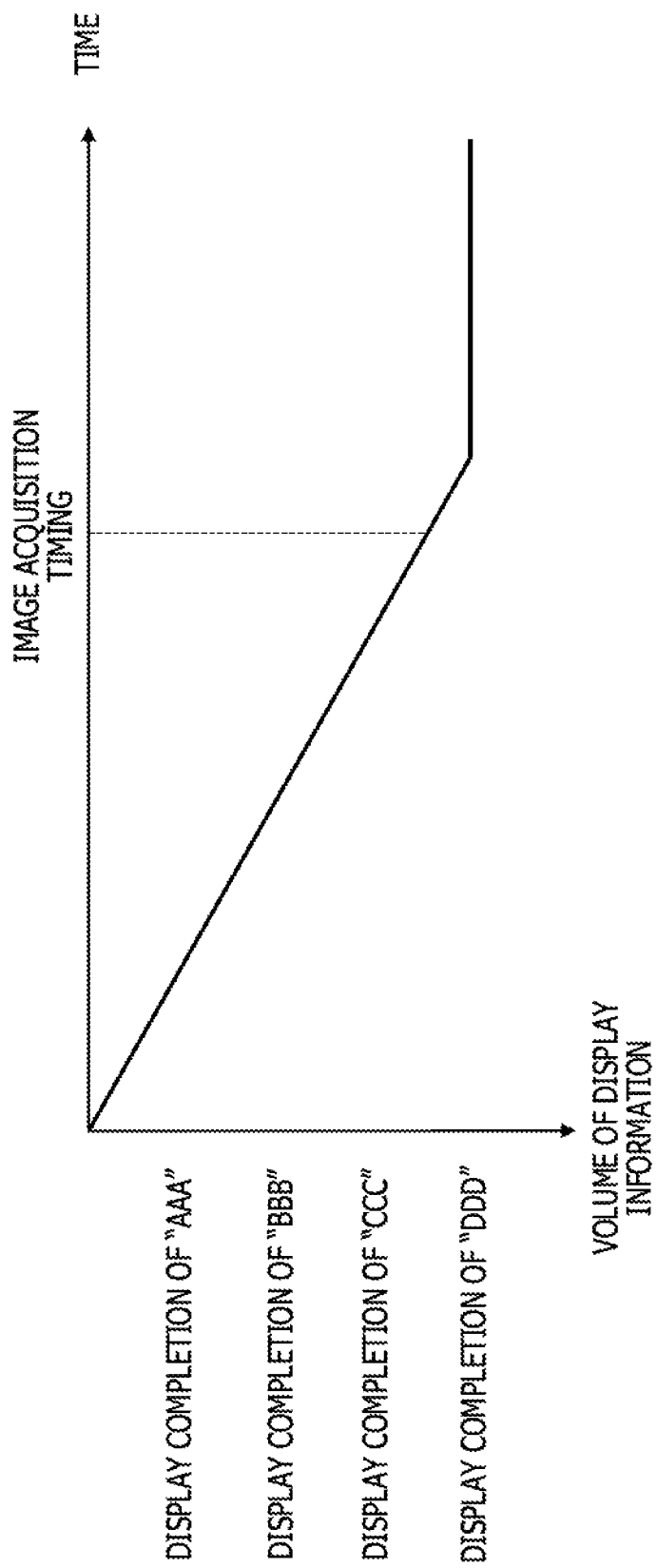
FIG. 4 is a diagram illustrating a specific example of an image that is not the stable image acquired by the screen display program.
Figure 5:
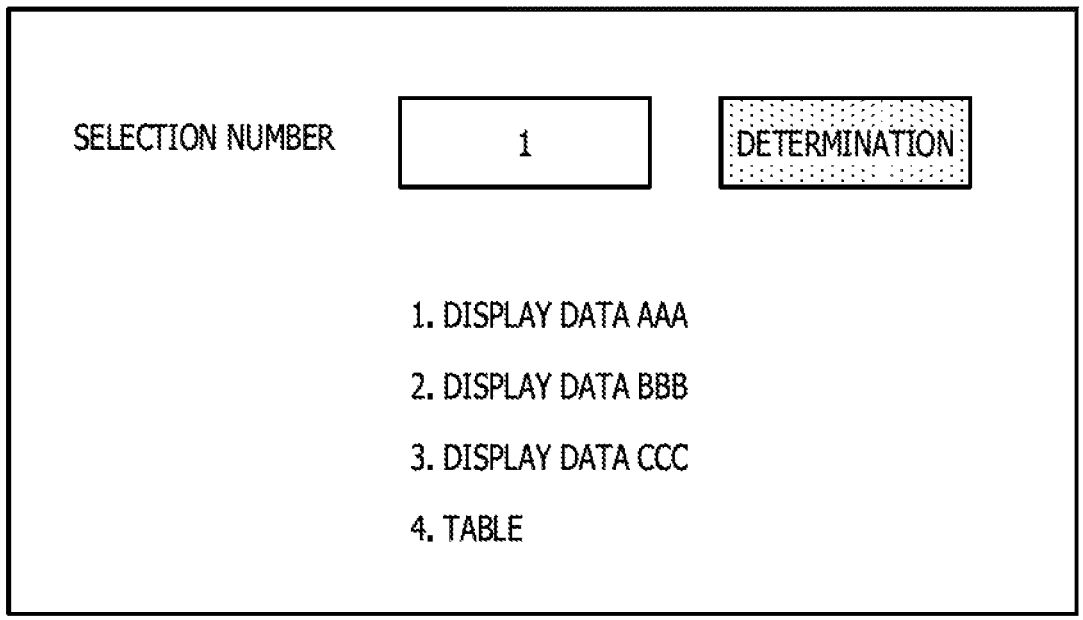
FIG. 5 is a diagram illustrating a specific example of an image that is not the stable image acquired by the screen display program.

Specific Example of Image that is not Stable Image Acquired by Screen Display Program FIGS. 4 and 5 are diagrams illustrating a specific example of the image that is not a stable image acquired by the screen display program.

The graph illustrated in FIG. 4 is a graph illustrating a relationship between the display completion timing of "AAA", "BBB", "CCC" and "DDD" on a screen where the acquisition turnaround time is longer than the standby time and the image acquisition timing by the screen display program. Similar to the graph illustrated in FIG. 2, in the graph illustrated in FIG. 4, the horizontal axis represents the time and the vertical axis represents the volume of information that is desired to be displayed in order to display the screen.

Specifically, in the graph illustrated in FIG. 4, the image acquisition timing is after the display completion timing of "CCC" and before the display completion timing of "DDD". Therefore, in this case, as illustrated in FIG. 5, the information processing device (for example, the information processing device 1) executing the screen display program can acquire the image (the image is not the stable image) in which display of "DDD" is completed.

Therefore, in the screen confirmation test, even in a case where the person in charge of the test detects that an abnormality is present in the acquired image, it is difficult to easily determine whether the cause of the detected abnormality is due to a defect in the screen display program, or whether the displayed screen is due to not being a stable image. Therefore, in this case, it is difficult for the person in charge of the test to efficiently perform the screen confirmation test.

Therefore, in the information processing device 1 according to the present embodiment acquires a first image and a second image among a plurality of images sequentially displayed on the display unit (for example, the display device of the operation terminal 3) according to the display instruction of a specific image. The information processing device 1 determines whether the degree of coincidence between the acquired first image and the acquired second image satisfies the criterion. As a result, in a case where the degree of coincidence between the first image and the second image satisfies the criterion, the information processing device 1 refers to the storage unit that stores the reference image correlated with the display instruction, and acquires the reference image associated with the display instruction of the specific image, compares the acquired reference image and any one image of the first image and the second image, and outputs the comparison result.

That is, for example, the information processing device 1 according to the present embodiment acquires an image corresponding to the screen displayed on the display unit a plurality of times, and each time the image is acquired, compares the image acquired at this time a currently acquired image and a previously acquired image. For example, in a case where the degree of coincidence between the currently acquired image and the previously acquired image converges to the predetermined criterion, the information processing device 1 determines that the screen displayed on the display unit is in a state where the stable image can be acquired and specifies the image corresponding to the screen displayed on the display unit as the stable image. Thereafter, the information processing device 1 compares the specified stable image and the reference image.

Accordingly, even in a case where there is a screen in which the acquisition time is longer than the standby time, the information processing device 1 can accurately acquire the stable image corresponding to the respective screens. Therefore, the person in charge of the test can efficiently confirm the screen displayed on the display unit.

Hardware Configuration of Information Processing Device

Figure 6:
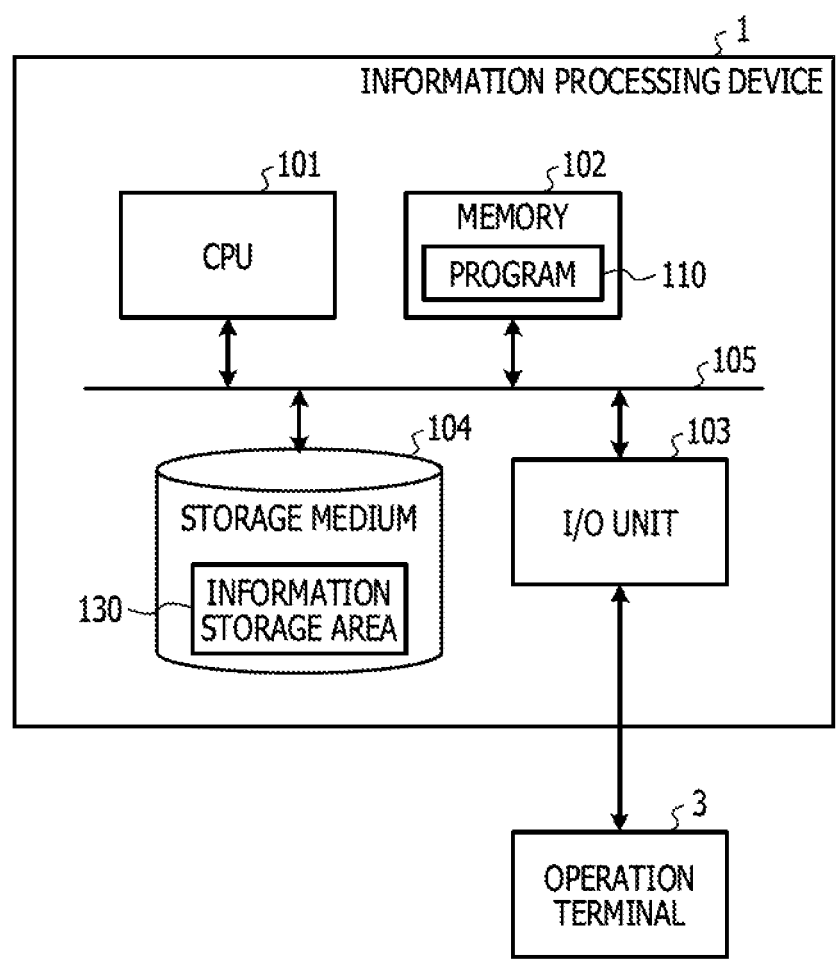
FIG. 6 is a diagram illustrating a hardware configuration of an information processing device.

Next, a hardware configuration of the information processing device 1 will be described. FIG. 6 is a diagram illustrating the hardware configuration of the information processing device 1.

As illustrated in FIG. 6, the information processing device 1 includes a CPU 101 that is a processor, a memory 102, an external interface (I/O unit) 103, and a storage medium (storage) 104. The respective units are connected to each other via a bus 105.

The storage medium 104 stores, for example, a screen display program 110 (hereinafter, also referred to as a program 110) in a program storage area (not illustrated) in the storage medium 104.

As illustrated in FIG. 6, the CPU 101 loads the program 110 from the storage medium 104 into the memory 102 at the time of execution of the program 110, performs processing of comparing the displayed images by cooperating with the program 110 (hereinafter, simply referred to as comparison processing) or the like.

The storage medium 104 is, for example, a hard disk drive (HDD), a solid state drive (SSD), or the like, and includes an information storage area 130 that stores information used for performing comparison processing (hereinafter, also referred to as a storage area 130).

In addition, the external interface 103 communicates with the operation terminal 3 via a network.

Software Configuration of Information Processing Device

Figure 7:
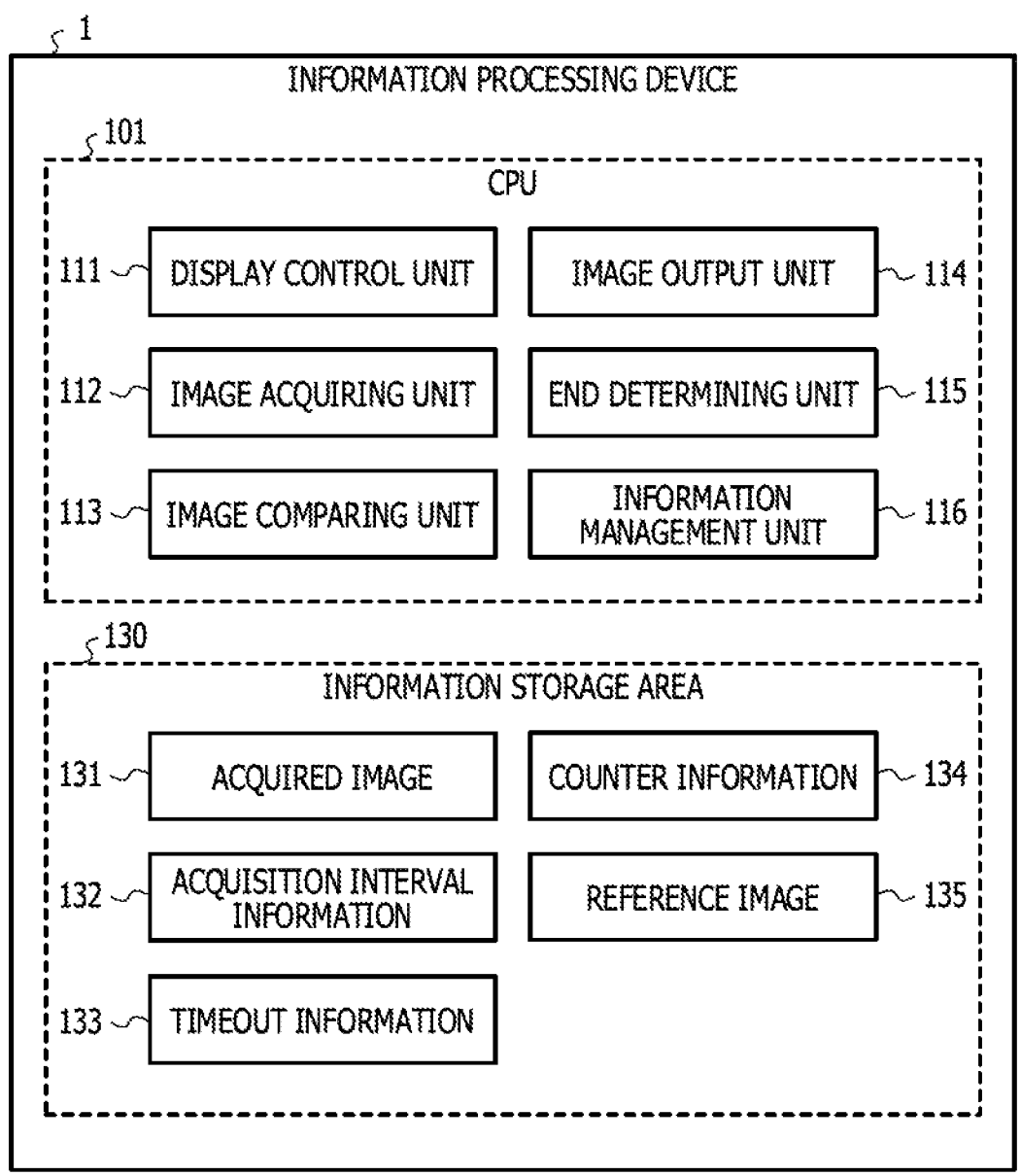
FIG. 7 is a block diagram of a function of the of the information processing device.

Next, a software configuration of the information processing device 1 will be described. FIG. 7 is a block diagram of a function of the information processing device 1.

As illustrated in FIG. 7, by cooperating with the program 110, the CPU 101 is operated as a display control unit 111, an image acquiring unit 112, an image comparing unit 113, an image output unit 114, an end determining unit 115, and an information management unit 116.

As illustrated in FIG. 7, in the information storage area 130, an acquired image 131, acquiring interval information 132, timeout information 133, counter information 134, and a reference image 135 are stored.

For example, the display control unit 111 displays the screen for performing a screen confirmation test on the display device of the operation terminal 3. That is, the display control unit 111 executes processing to be confirmed for operation performed by the screen confirmation test. Specifically, for example, the display control unit 111 displays the screen for performing the screen confirmation test according to receiving the screen display instruction from the operation terminal 3.

The image acquiring unit 112 sequentially acquires, for example, the image corresponding to the screen displayed on the display device of the operation terminal 3 according the instruction to display the screen to the display control unit 111. Then, the image acquiring unit 112 stores the acquired image as the acquired image 131 in the information storage area 130.

The image comparing unit 113 compares the first image acquired by the image acquiring unit 112 and the second image acquired after the first image. Specifically, the image comparing unit 113 compares the first image and the second image, and determines whether the degree of coincidence between the first image and the second image satisfies the criterion. The second image may be, for example, an image acquired immediately after the first image.

In addition, in a case where the degree of coincidence between the first image and the second image satisfies the criterion, for example, the image comparing unit 113 acquires the reference image 135 corresponding to the display instruction performed by the display control unit 111 from the reference image 135 stored in the information storage area 130 in advance. The image comparing unit 113 compares the acquired reference image 135 and any one of the first image and the second image acquired by the image acquiring unit 112.

The image output unit 114 outputs the comparison result between the reference image 135 and the first image or the second image by the image acquiring unit 112.

For example, in a case where the degree of coincidence between the first image and the second image acquired by the image acquiring unit 112 does not satisfy the criterion during a period from start of the image acquisition by the image acquiring unit 112 until the predetermined time elapses, the end determining unit 115 ends the processing by the image acquiring unit 112 and the image comparing unit 113.

For example, before the image acquiring unit 112, the image comparing unit 113, and the image output unit 114 start processing, the information management unit 115 stores the acquisition interval information 132, the timeout information 133, the counter information 134, and the reference image 135 in an information storage area 130 in advance.

Outline of First Embodiment

Next an outline of a first embodiment will be described.

Figure 8:
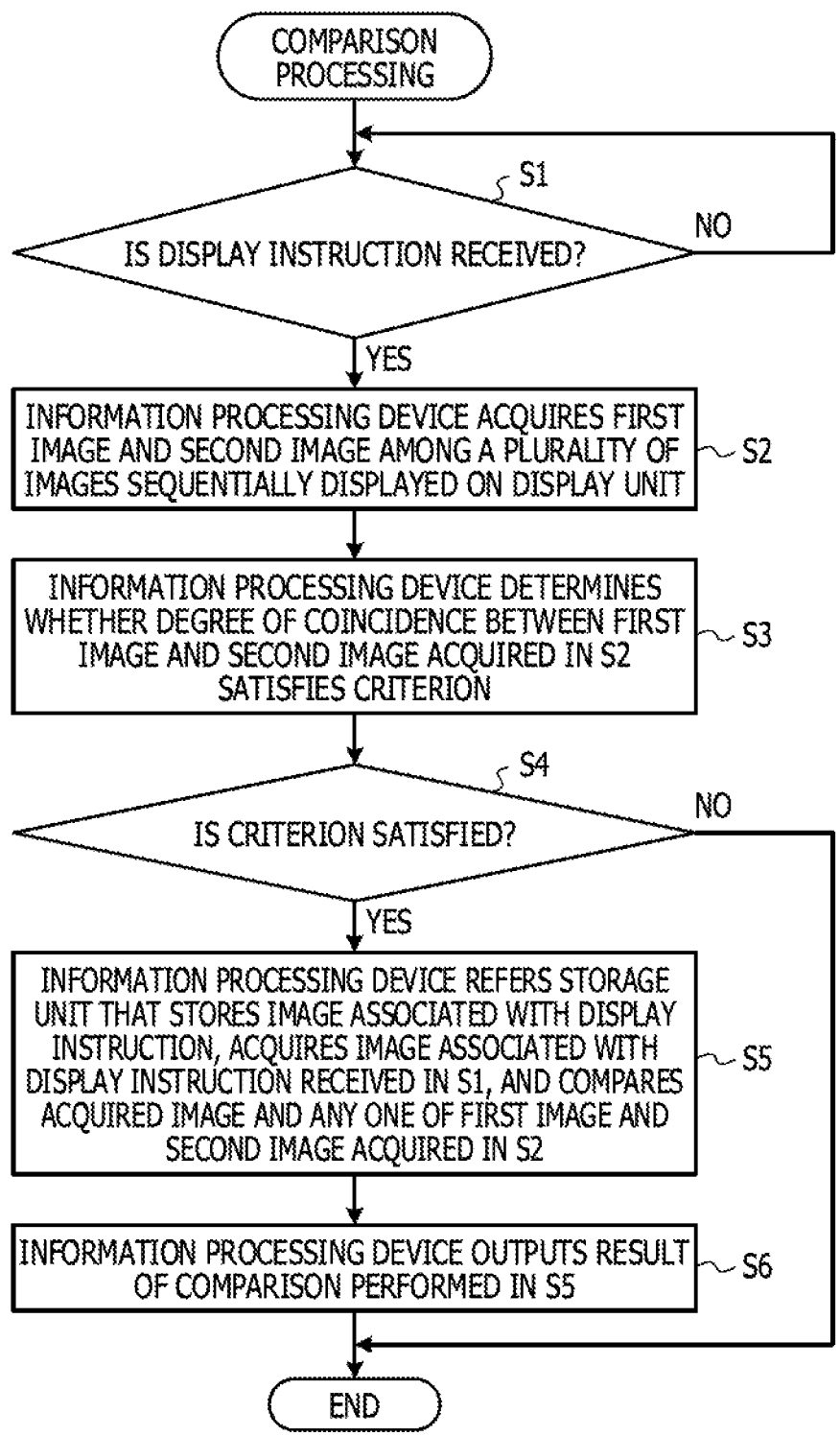
FIG. 8 is a flowchart illustrating an outline of comparison processing in a first embodiment.

FIG. 8 is a flowchart illustrating an outline of comparison processing in the first embodiment. FIGS. 9 to 12 are diagrams illustrating the outline of the comparison processing in the first embodiment. The outline of the comparison processing illustrated in FIG. 8 will be described with reference to FIGS. 9 to 12.

Figure 9:
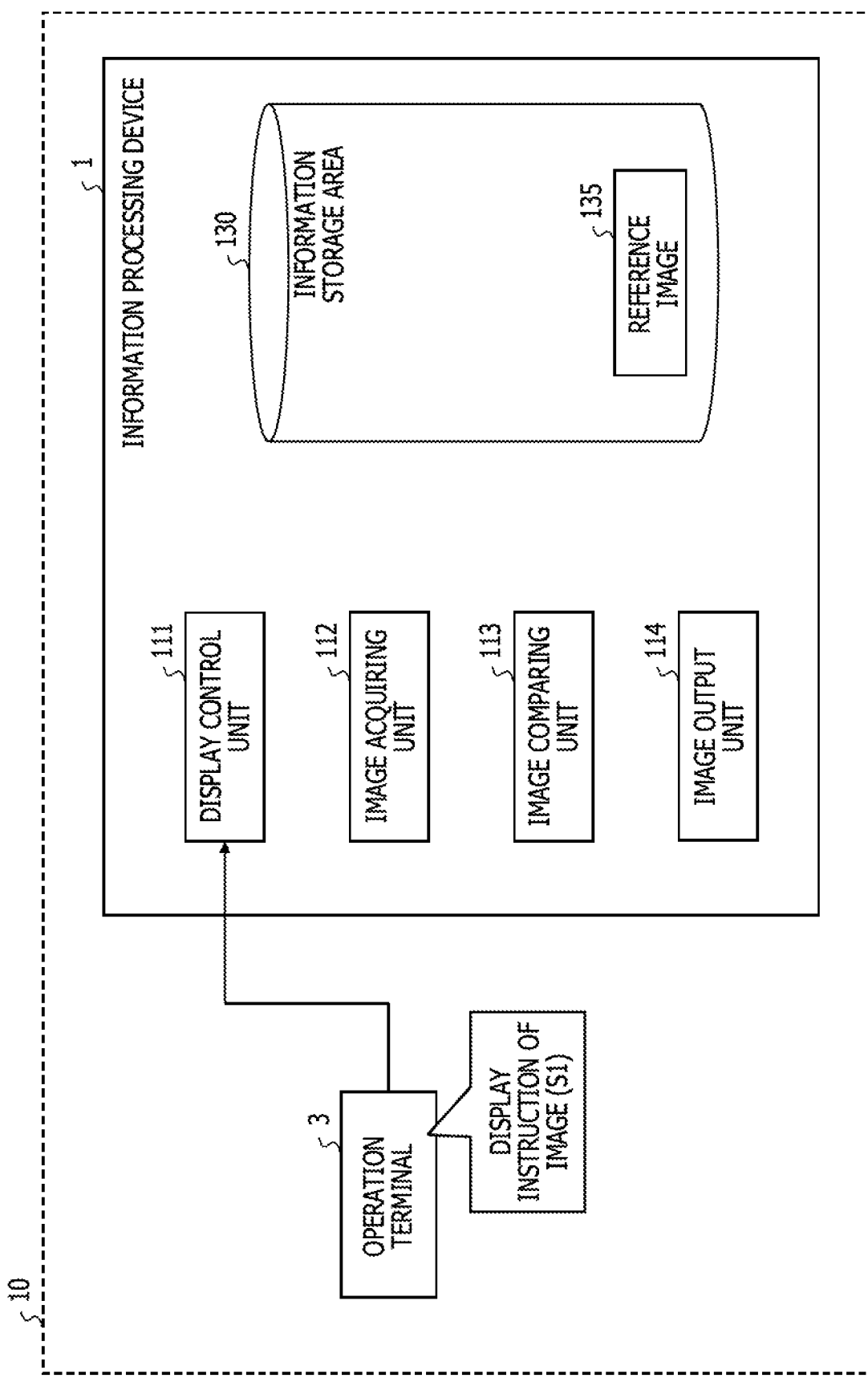
FIG. 9 is a diagram illustrating the outline of the comparison processing in the first embodiment.

As illustrated in FIG. 8, the display control unit 111 of the information processing device 1 stands by until receiving the screen display instruction (NO of S1). Specifically, for example, as illustrated in FIG. 9, the display control unit 111 stands by until the user inputs the screen display instruction via the operation terminal 3.

Figure 10:
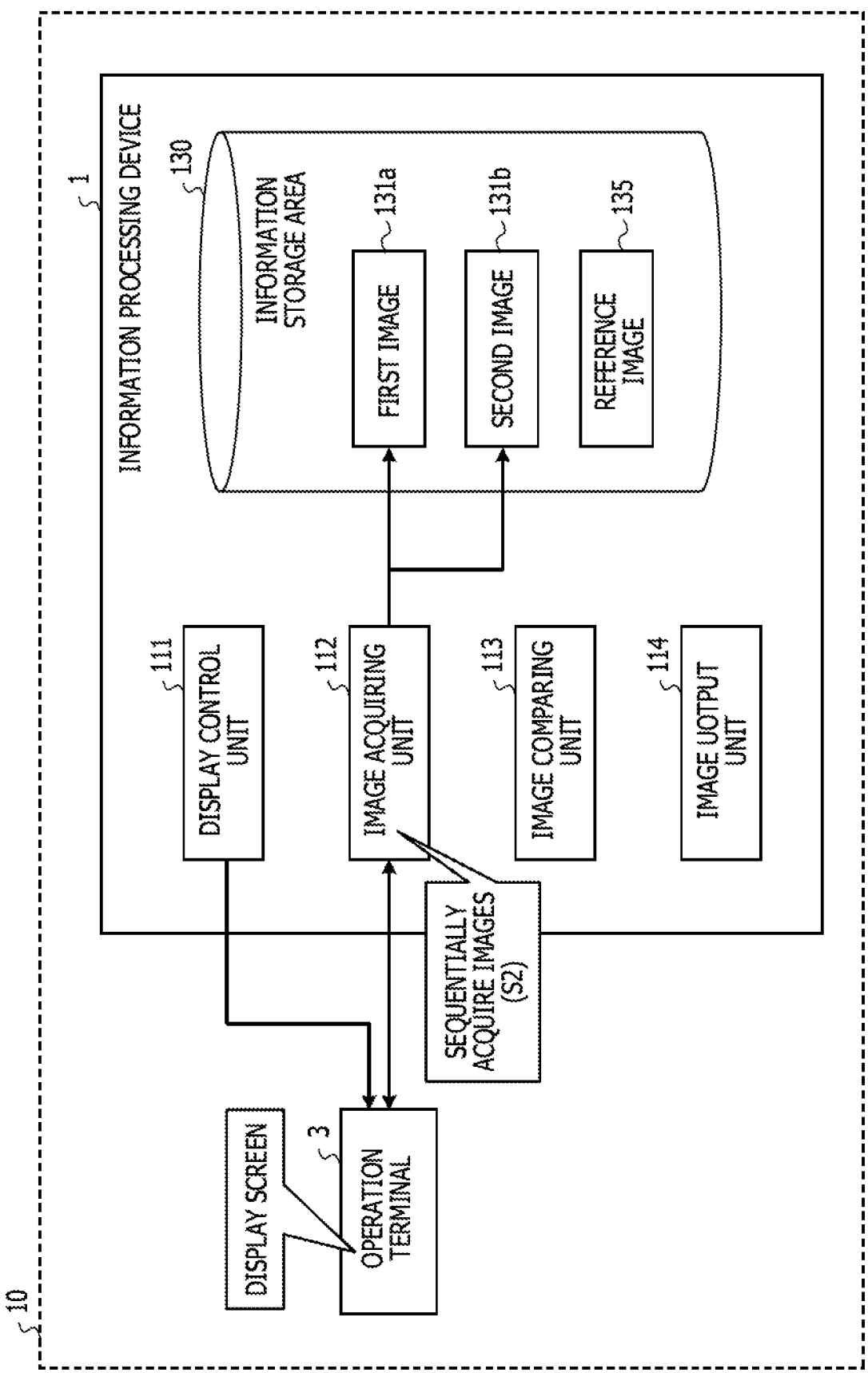
FIG. 10 is a diagram illustrating the outline of the comparison processing in the first embodiment.

In a case where the instruction to display the screen is received (YES in S1), as illustrated in FIG. 10, for example, the image acquiring unit 112 of the information processing device 1 acquires a first image 131a and a second image 131b among a plurality of images sequentially displayed on the display device of the operation terminal 3, for example (S2). Specifically, for example, the image acquiring unit 112 acquires the first image 131a and the second image 131b among the images corresponding to the screen displayed on the display device of the operation terminal 3 according to the screen display instruction to the display control unit 111.

Figure 11:
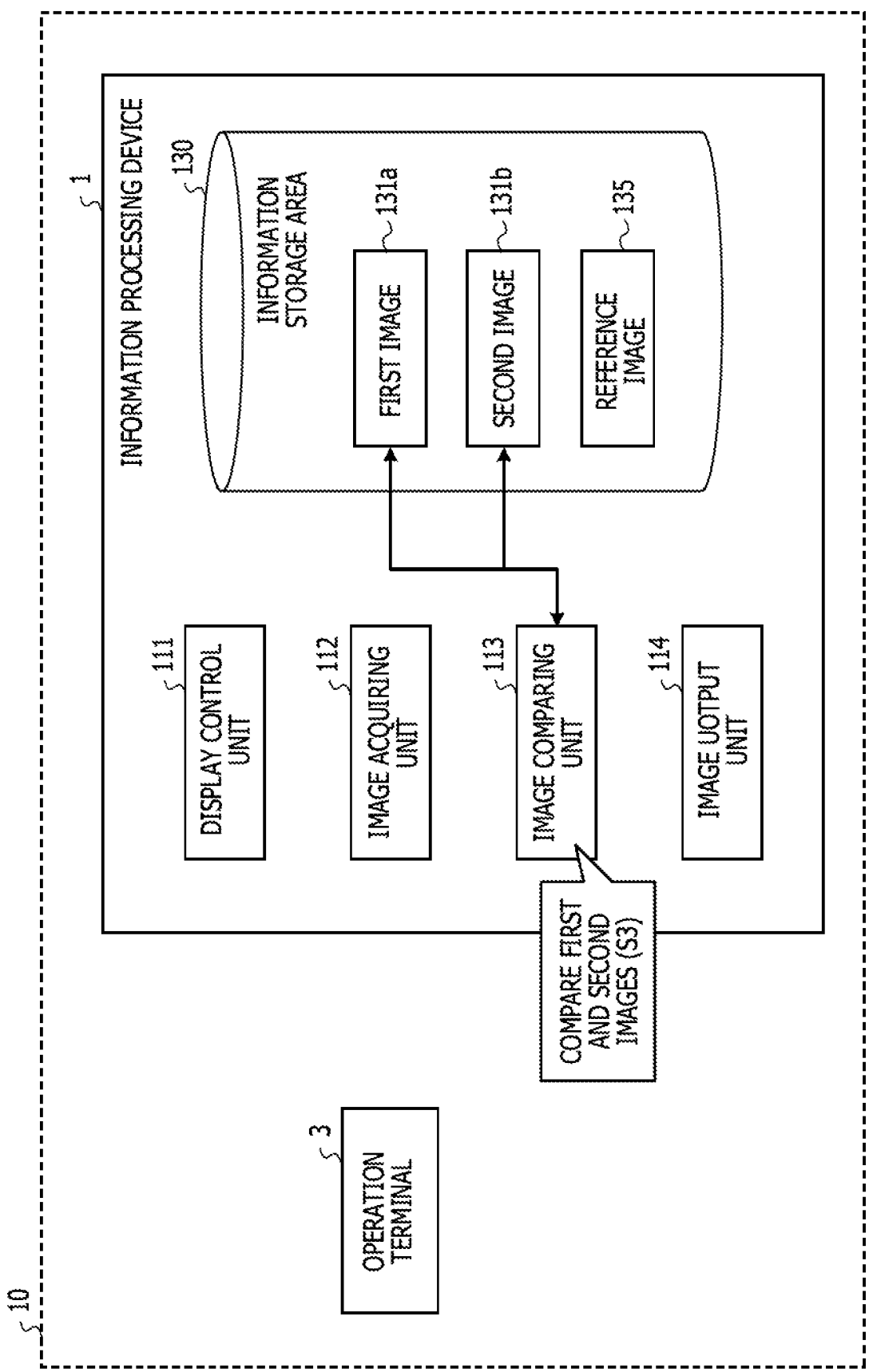
FIG. 11 is a diagram illustrating the outline of the comparison processing in the first embodiment.

Subsequently, as illustrated in FIG. 11, the image comparing unit 113 of the information processing device 1 determines whether the degree of coincidence between the first image 131a and the second image 131b acquired in the processing of S2 satisfies the criterion (S3).

Figure 12:
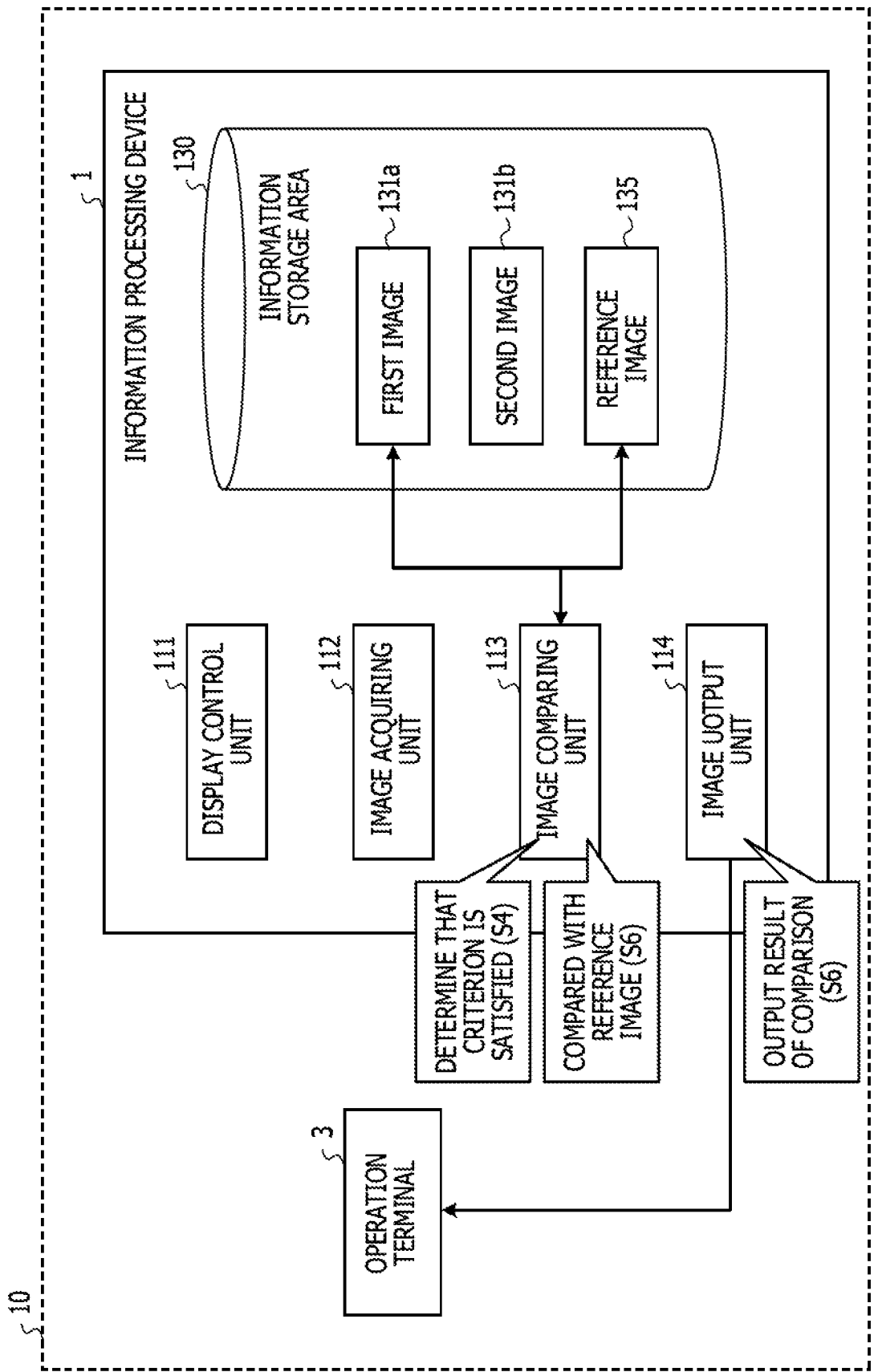
FIG. 12 is a diagram illustrating the outline of the comparison processing in the first embodiment.

As a result, in a case where the degree of coincidence between the first image 131a and the second image 131b satisfies the criterion (YES in S4), as illustrated in FIG. 12, the image comparing unit 113 refers to the information storage area 130 storing the reference image 135 associated with the display instruction, acquires the reference image 135 associated with the display instruction received in the processing of S1, and compares the acquired reference image 135 and any one image of the first image 131a and the second image 131b acquired in the processing of S2 (S5).

Thereafter, as illustrated in FIG. 12, the image output unit 114 of the information processing device 1 outputs the result of the comparison performed in the processing of S5 (S6).

On the other hand, in the processing of S4, in a case where the degree of coincidence between the first image 131a and the second image 131b does not satisfy the criterion (NO in S4), the image comparing unit 113 and the image output unit 114 does not perform the processing of S5 and S6.

That is, for example, the information processing device 1 according to the present embodiment acquires an image corresponding to the screen displayed on the display unit a plurality of times, and each time the image is acquired, compares the image acquired at this time a currently acquired image and a previously acquired image. For example, in a case where the degree of coincidence between the currently acquired image and the previously acquired image converges to the predetermined criterion, the information processing device 1 determines that the screen displayed on the display unit is in a state where the stable image can be acquired and specifies the image corresponding to the screen displayed on the display unit as the stable image. Thereafter, the information processing device 1 compares the specified stable image and the reference image 135.

Accordingly, even in a case where there is a screen in which the acquisition time is longer than the standby time, the information processing device 1 can accurately acquire the stable image corresponding to the respective screens. Therefore, the person in charge of the test can efficiently confirm the screen displayed on the display unit.

Details of First Embodiment

Figure 13:
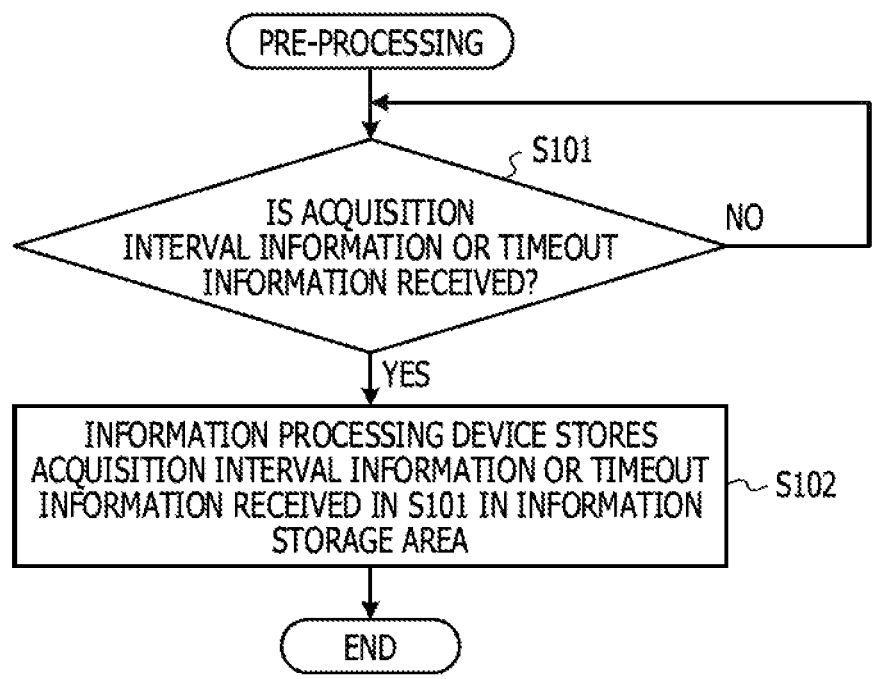
FIG. 13 is a flowchart illustrating details of the comparison processing in the first embodiment.
Figure 14:
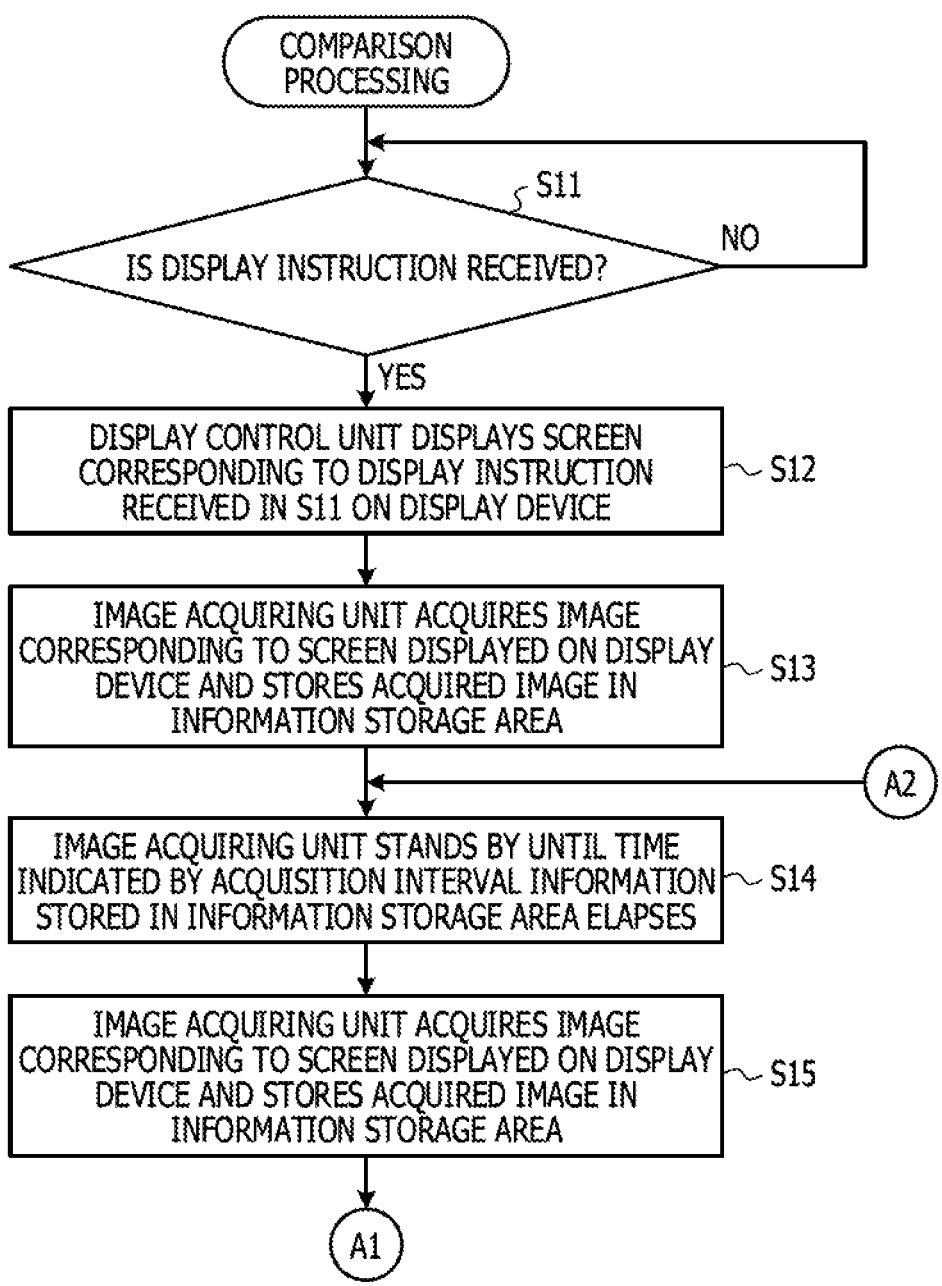
FIG. 14 is a flowchart illustrating the details of the comparison processing in the first embodiment.
Figure 15:
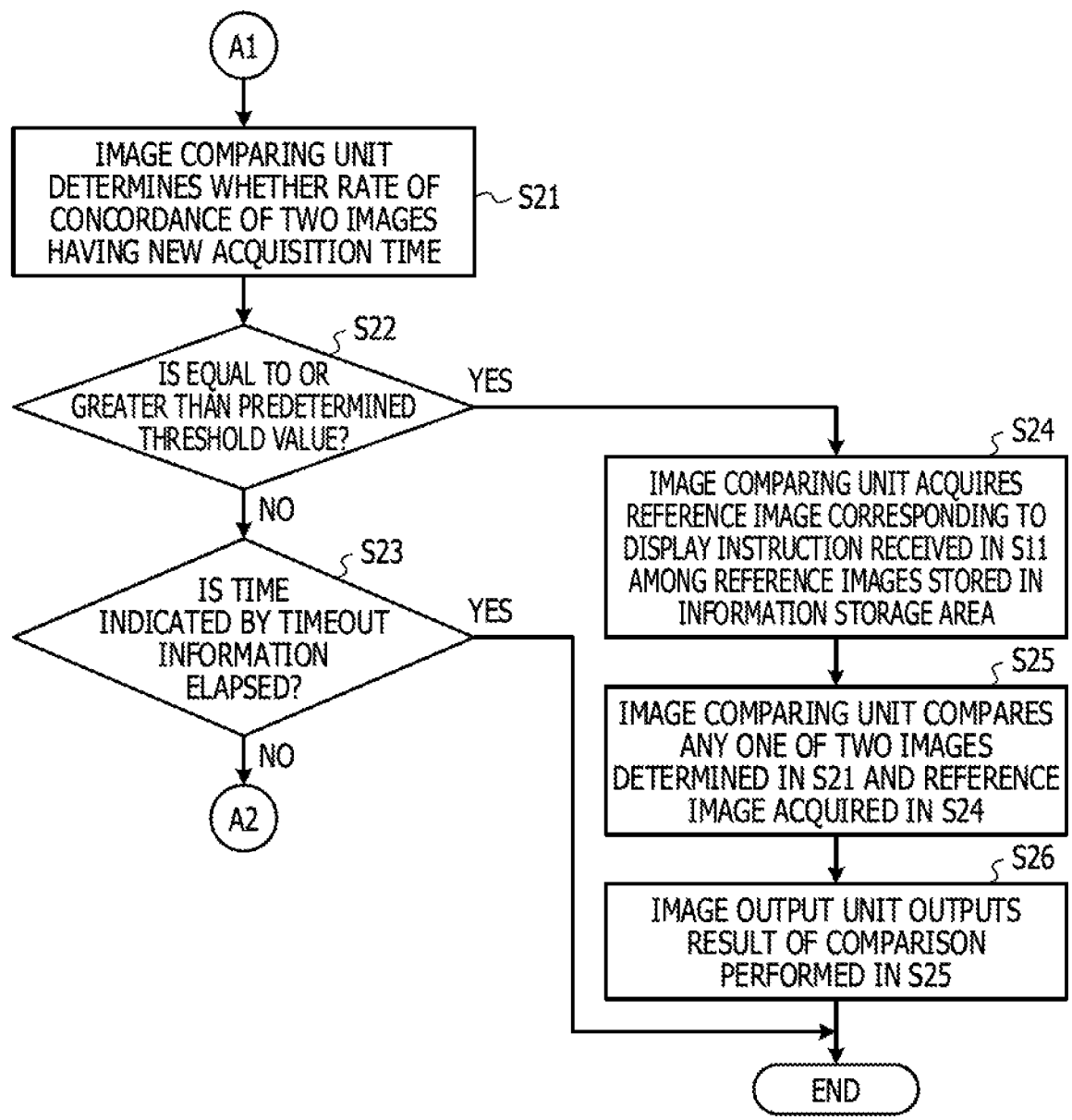
FIG. 15 is a flowchart illustrating the details of the comparison processing in the first embodiment.
Figure 16:
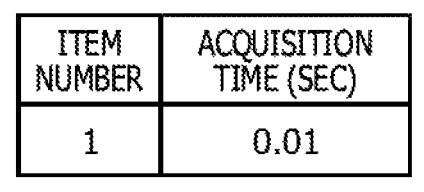
Figure 17:
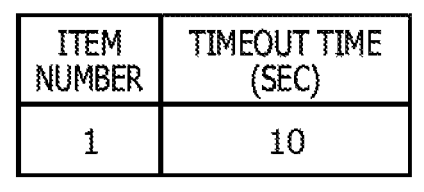
Figure 18:
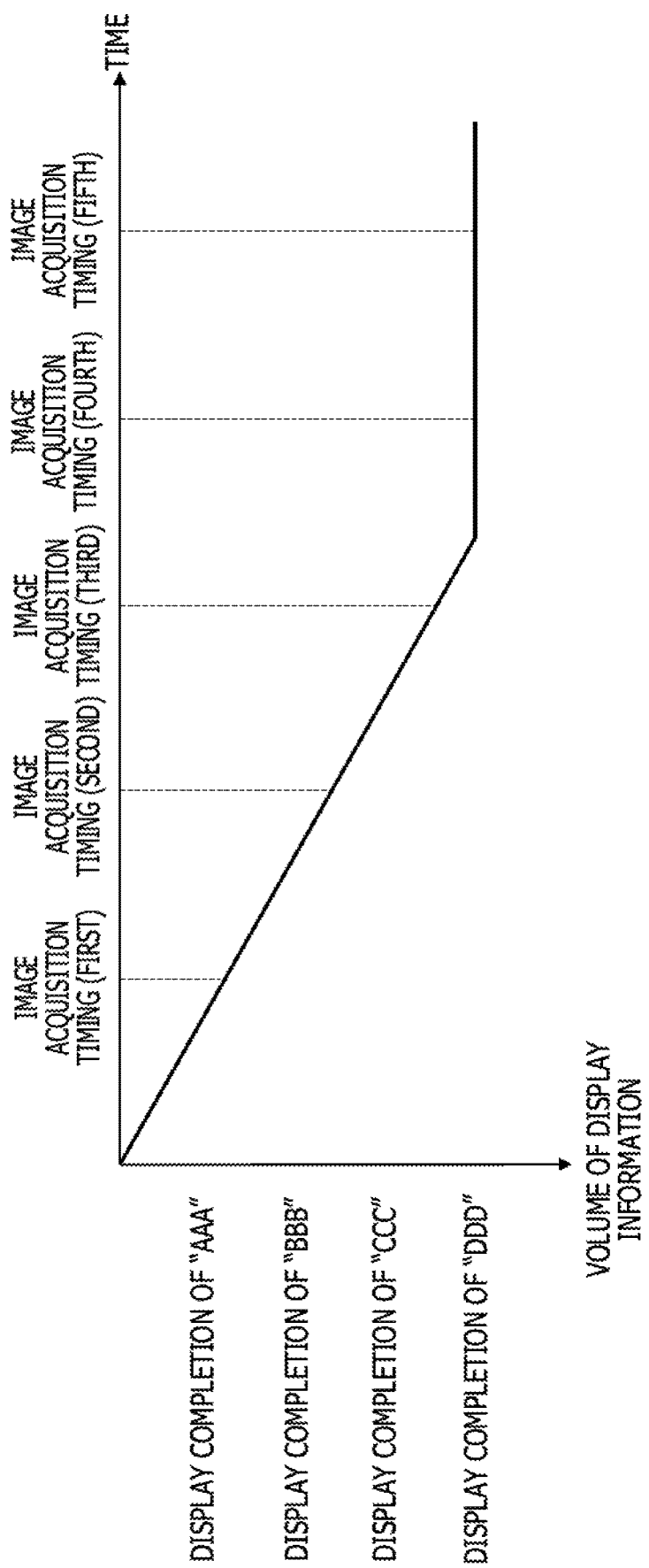
FIG. 18 is a diagram illustrating the details of the comparison processing in the first embodiment.

Next, the details of the first embodiment will be described. FIGS. 13 to 15 are flowcharts illustrating the details of the comparison processing in the first embodiment. In addition, FIGS. 16 to 18 are diagrams illustrating the details of the comparison processing in the first embodiment. The details of the comparison processing illustrated in FIGS. 13 to 15 will be described with reference to FIGS. 16 to 18.

Pre-Processing

First, the processing executed before the comparison processing (hereinafter, also referred to as pre-processing) will be described. FIG. 13 is a flowchart for illustrating the pre-processing.

The information management unit 116 of the information processing device 1 stands by until receiving the acquisition interval information 132 or the timeout information 133 (NO in S101). Specifically, for example, the information management unit 116 stands by until the user inputs the acquisition interval information 132 or the timeout information 133 via the operation terminal 3.

In a case where the acquisition interval information 132 or the timeout information 133 is received (YES in S101), the information management unit 116 stores the acquisition interval information 132 or the timeout information 133 received in S101 in the information storage area 130 (S102). Hereinafter, the specific examples of the acquisition interval information 132 and the timeout information 133 will be described.

Specific Example of Acquisition Interval Information and Timeout Information

First, a specific example of the acquisition interval information 132 will be described. FIG. 16 is a diagram illustrating the specific example of the acquisition interval information 132.

The acquisition interval information 132 illustrated in FIG. 16 includes "item number" for identifying each information included in the acquisition interval information 132 and "acquisition interval" for setting the image acquisition interval as items.

Specifically, in the acquisition interval information 132 illustrated in FIG. 16, "0.01 (sec)" is set as the "acquisition time" in the information in which "item number" is "1".

Next, a specific example of the timeout information 133 will be described. FIG. 17 is a diagram illustrating the specific example of the timeout information 133.

The timeout information 133 illustrated in FIG. 17 includes "item number" for identifying each information included in the timeout information 133 and "timeout time" for setting the timeout time as items.

Specifically, in the timeout information 133 illustrated in FIG. 17, "10 (sec)" is set as the "timeout time" in the information in which "item number" is "1".

If desired, the business operator may update the information set in the "acquisition time" of the acquisition interval information 132 and the information set in the "timeout time" of the timeout information 133 on an as-desired basis.

Details of Comparison Processing

Next, the details of the comparison processing will be described. FIGS. 14 and 15 are flowcharts illustrating the details of the comparison process.

The display control unit 111 of the information processing device 1 stands by until receiving the screen display instruction (NO in S11). Specifically, for example, the display control unit 111 stands by until the user inputs the screen display instruction via the operation terminal 3.

Then, in a case where the instruction to display the screen is received (YES in S11), the display control unit 111 displays the screen corresponding to the display instruction received in the processing of S11 on the display device of the operation terminal 3 (S12), for example. Subsequently, the image acquiring unit 112 of the information processing device 1, for example, acquires the image corresponding to the screen displayed on the display device of the operation terminal 3 and stores the acquired image in the information storage area 130 (S13). Specifically, the image acquiring unit 112 accumulates the acquired image as a part of the acquired image 131 in the information storage area 130.

Thereafter, the image acquiring unit 112 stands by until the time indicated by the acquisition interval information 132 stored in the information storage area 130 elapses (S14). Specifically, in the acquisition interval information 132 illustrated in FIG. 16, "0.01 (sec)" is set as the "acquisition interval". Therefore, for example, after the processing of S13 is performed, the image acquiring unit 112 performs processing after S15 after elapse of 0.01 seconds.

Furthermore, the image acquiring unit 112 acquires, for example, the image corresponding to the screen displayed on the display device of the operation terminal 3, and stores the acquired image in the information storage area 130 (S15). That is, for example, the image acquiring unit 112 acquires the image corresponding to the screen displayed on the display device of the operation terminal 3 again. Specifically, the image acquiring unit 112 accumulates the acquired image as a part of the acquired image 131 in the information storage area 130.

Next, as illustrated in FIG. 15, the image comparing unit 113 of the information processing device 1 determines whether the rate of concordance of two images having new acquisition times among the acquired images 131 stored in the information storage area 130 is equal to or greater than a predetermined threshold value (S21). That is, the information processing device 1 determines whether two images having new acquisition times are stable images.

Specifically, when storing the image in the processing of S13 or the like, the image acquiring unit 112 may store information (not illustrated) indicating the time at which the image is stored in the information storage area 130. The image comparing unit 113 may specify two images with new acquisition times by referring to the information indicating the time stored in the information storage area 130, and determine whether the rate of concordance of the specified two images is equal to or more than the predetermined threshold value.

As a result, in a case where it is determined that the rate of concordance is equal to or greater than the predetermined threshold value YES in S22), the image comparing unit 113 acquires the reference image 135 corresponding to the display instruction received in the processing of S11 among the reference images 135 stored in the information storage area 130 (S24). The image comparing unit 113 compares any one of the two images determined in the processing of S21 with the reference image 135 acquired in the processing of S24 (S25).

Thereafter, the image output unit 114 of the information processing device 1 outputs the result of the comparison performed in the process of S25 (S26). Specifically, for example, the image output unit 114 outputs the result of the comparison to the display device of the operation terminal 3.

On the other hand, in a case where it is determined that the rate of concordance is not equal to or greater than the predetermined threshold value in the processing of S22 (NO in S22), the end determining unit 115 of the information processing device 1, for example, after the process of S12 is performed, it is determined whether the time indicated by the timeout information 133 stored in 130 is elapsed (S23).

In a case where it is determined that the time indicated by the timeout information 133 is not elapsed (NO in S23), the image acquiring unit 112 performs the processing after S14 again. That is, in this case, the information processing device 1 is, for example, an image corresponding to the screen displayed on the display device of the operation terminal 3 is not the stable image. Furthermore, the information processing device 1 determines that the timeout time is not elapsed. Therefore, the information processing device 1 continues the comparison processing in this case.

On the other hand, in a case where it is determined that the time indicated by the timeout information 133 is elapsed (YES in S23), the end determining unit 115 ends the comparison processing.

That is, for example, the information processing device 1 according to the present embodiment acquires an image corresponding to the screen displayed on the display unit of the operation terminal 3 a plurality of times, and each time the image is acquired, compares the image acquired at this time a currently acquired image and a previously acquired image.

Specifically, as illustrated in FIG. 18, in a case where an image at "image acquisition timing (second time)" is acquired, for example, the information processing device 1 compares an image acquired at "image acquisition timing (first time)" and an image acquired at "image acquisition timing (second time)". In addition, for example, in a case where an image at "image acquisition timing (third time)" is acquired, for example, the information processing device 1 compares the image acquired at "image acquisition timing (second time)" and an image acquired at "image acquisition timing (third time)".

For example, in a case where the degree of coincidence between the currently acquired image and the previously acquired image converges to the predetermined criterion, the information processing device 1 determines that the screen displayed on the display unit is in a state where the stable image can be acquired and specifies the image corresponding to the screen displayed on the display unit as the stable image. Thereafter, the information processing device 1 compares the specified stable image with the reference image 135.

Specifically, in the graph illustrated in FIG. 18, the output of "DDD" is completed between the "image acquisition timing (third time)" and an "image acquisition timing (fourth time)". Therefore, in this case, for example, when comparing the image acquired in the "image acquisition timing (fourth time)" and an image acquired in "image acquisition timing (fifth time)", the information processing device 1 determines that the displayed screen is in a state where the stable image can be acquired. Therefore, in this case, the information processing device 1 compares one of the image acquired in the "image acquisition timing (fourth time)" and the image acquired in "image acquisition timing (fifth time)" and the reference image 135.

Accordingly, even in a case where there is a screen in which the acquisition time is longer than the standby time, the information processing device 1 can accurately acquire the stable image corresponding to the respective screens. Therefore, the information processing device 1 can cause the person in charge of the test to efficiently confirm the screen displayed on the display unit (the screen confirmation test).

In a case where the processing of S26 is performed, the information management unit 116 may update the reference image 135 stored in the information storage area 130 to one of the two images determined in the processing of S21. In addition, for example, in a case where the instruction to update the reference image 135 (hereinafter, also referred to as an update instruction) is received via the operation terminal 3, the information management unit 116 updates the reference image 135 stored in the information storage area 130 to one of the two images determined in the processing of S21.

Accordingly, in a case where there no the reference image 135 to be used for comparing in the processing of S25 or a case where the change is desired, the information management unit 116 can automatically generate a nee reference image 135. Therefore, the information management unit 116 can reduce a probability of an increase in the burden on the business operator due to generation of a new reference image 135.

Details of Second Embodiment

Figure 19:
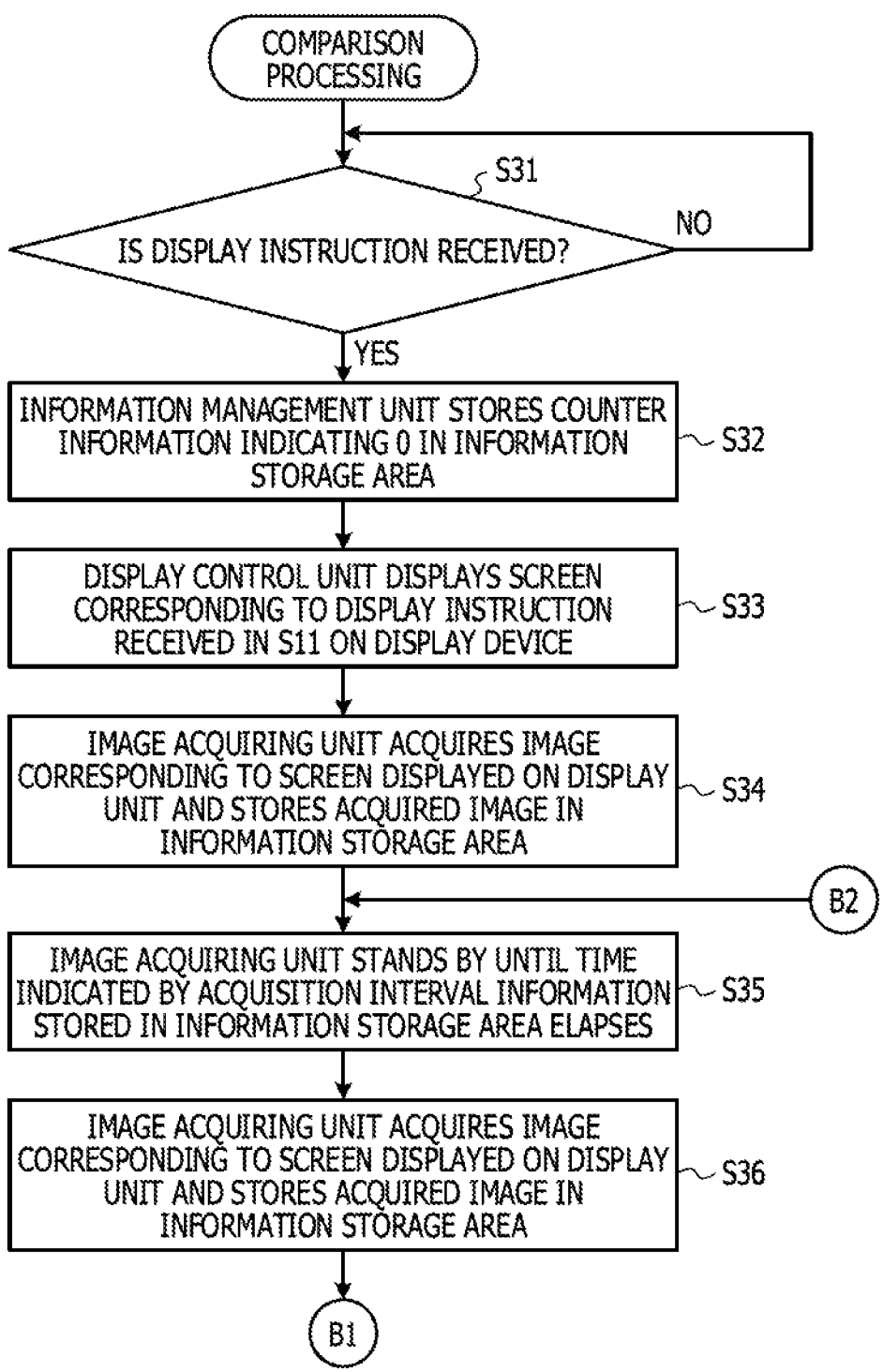
FIG. 19 is a flowchart illustrating comparison processing in a second embodiment.
Figure 20:
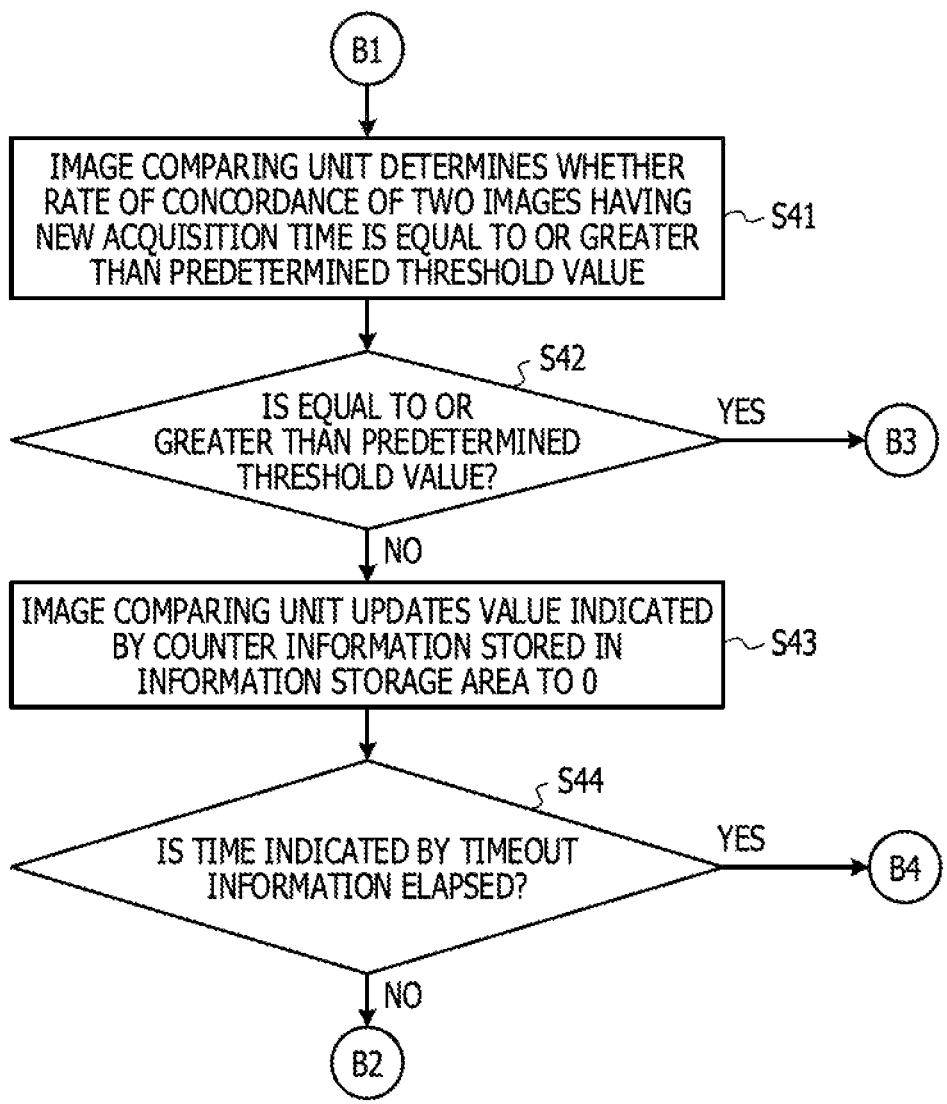
FIG. 20 is a flowchart illustrating the comparison processing in the second embodiment.
Figure 21:
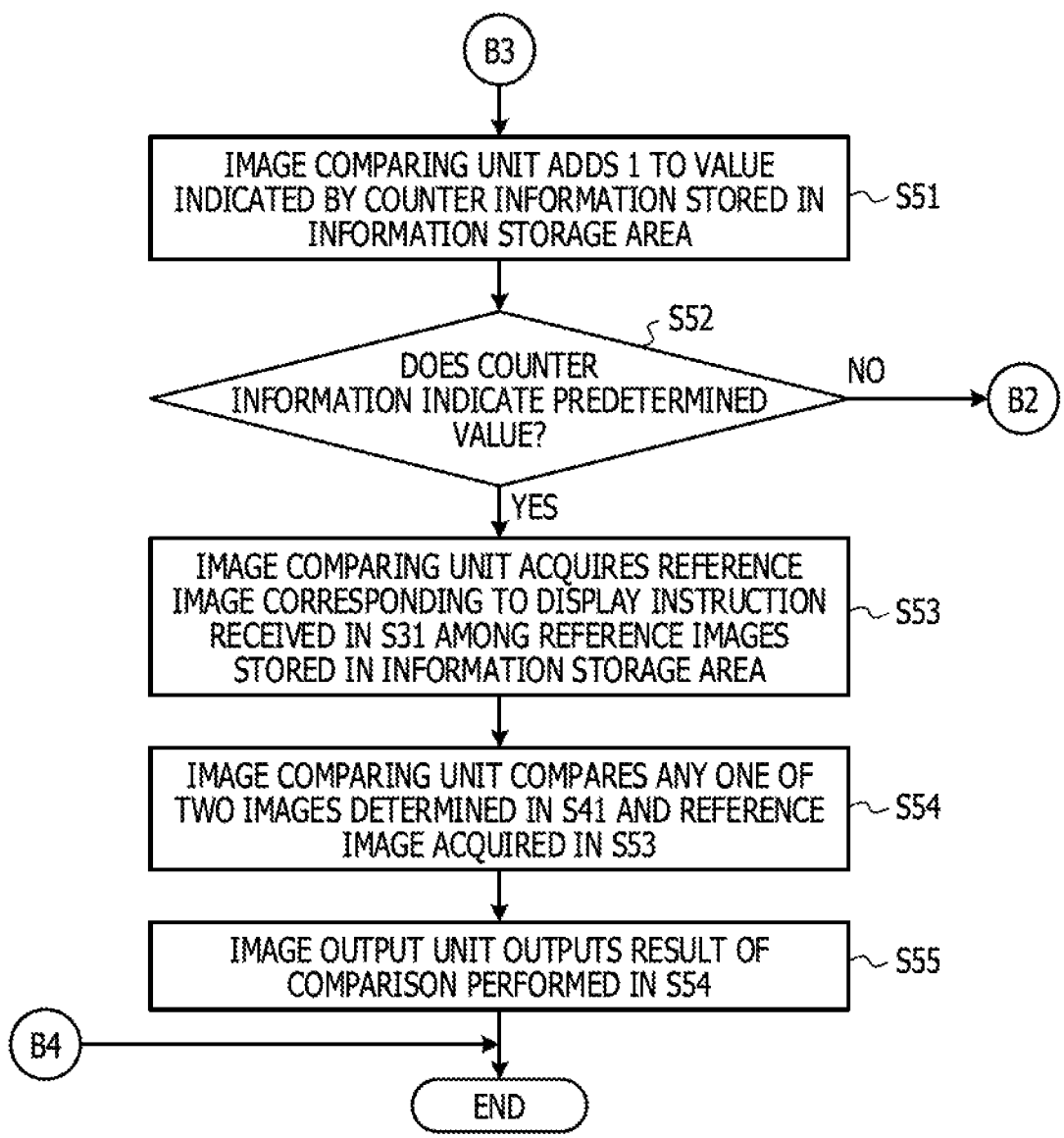
FIG. 21 is a flowchart illustrating the comparison processing in the second embodiment.

Next, a second embodiment will be described. FIGS. 19 to 21 are flowcharts illustrating comparison processing in the second embodiment.

Different from the case of the first embodiment, the information processing device 1 according to the second embodiment determines whether the number of consecutive times that the degree of coincidence of two images having new acquisition times satisfies the criterion reaches a predetermined number of times. Then, in a case where it is determined that the predetermined number of times is reached, the information processing device 1 compares the image (stable image) acquired from the display unit with the reference image 135. Hereinafter, a flowchart of comparison processing in the second embodiment will be described. Since the preprocessing in the second embodiment has the same contents as the pre-processing in the first embodiment, the description is omitted.

The display control unit 111 stands by until receiving the instruction to display the screen (NO in S31). Specifically, for example, the display control unit 111 stands by until the user inputs a screen display instruction via the operation terminal 3.

Then, in a case where the instruction to display the screen (YES in S31), the information management unit 116 stores, for example, the counter information 134 indicating 0 in the information storage area 130 (S32). That is, the information management unit 116 stores the counter information 134 indicating the initial value in the information storage area 130.

Subsequently, the display control unit 111 displays, for example, a screen corresponding to the display instruction received in the processing of S31 on the display device of the operation terminal 3 (S33).

Next, the image acquiring unit 112 acquires, for example, the image corresponding to the screen displayed on the display device of the operation terminal 3, and stores the acquired image in the information storage area 130 (S34). Specifically, the image acquiring unit 112 stores the acquired image as a part of the acquired image 131 in the information storage area 130.

Thereafter, the image acquiring unit 112 stands by until the time indicated by the acquisition interval information 132 stored in the information storage area 130 elapses (S35).

For example, the image acquiring unit 112 acquires the image corresponding to the screen displayed on the display device of the operation terminal 3 and stores the acquired image in the information storage area 130 (S36).

Next, as illustrated in FIG. 20, the image comparing unit 113 determines whether the rate of concordance of two images having new acquisition times among the acquired images 131 stored in the information storage area 130 is equal to or greater than a predetermined threshold value (S41). That is, the information processing device 1 determines whether two images having new acquisition times are stable images.

As a result, in a case where it is determined that the rate of concordance is equal to or greater than the predetermined threshold value (YES in S42), as illustrated in FIG. 21, the image comparing unit 113 adds 1 to the value indicated by the counter information 134 stored in the information storage area 130 (S51). That is, the image comparing unit 113 sets the number of consecutive times that the degree of coincidence between the two images satisfies the predetermined criterion as the counter information 134.

The image comparing unit 113 determines whether the value indicated by the counter information 134 stored in the information storage area 130 indicates a predetermined value (S52). Specifically, for example, the image comparing unit 113 may refer to a predetermined value indicated by predetermined value information (not illustrated) stored in the information storage area 130 and determine whether the value indicated by the counter information 134 indicates a predetermined value.

As a result, in a case where it is determined that the value indicated by the counter information 134 indicates a predetermined value (YES in S52), the image comparing unit 113 acquires the reference image 135 corresponding to the display instruction received in the processing of S31 (S53) among the reference images 135 stored in the information storage area 130. The image comparing unit 113 compares one of the two images determined in the processing of S41 and the reference image 135 acquired in the process of S53 (S54).

Thereafter, the image output unit 114 outputs the result of the comparison performed in the processing of S54 (S55). Specifically, for example, the image output unit 114 outputs the result of the comparison to the display device of the operation terminal 3.

Returning to FIG. 20, in a case where it is determined that the rate of concordance is not equal to or greater than the predetermined threshold value (NO in S42), the image comparing unit 113 updates the value indicated by the counter information 134 stored in the information storage area 130 to 0 (S43). That is, since the rate of concordance of the two images having new acquisition times is not equal to or greater than the predetermined threshold value, the image comparing unit 113 sets the value indicated by the counter information 134 to the initial value.

Thereafter, for example, the end determining unit 115 determines whether the time indicated by the timeout information 133 stored in the information storage area 130 has elapsed since the processing of S33 is performed (S44).

In a case where it is determined that the time indicated by the timeout information 133 is not elapsed (NO in S44), the image acquiring unit 112 performs the processing after S35 again. On the other hand, in a case where it is determined that the time indicated by the timeout information 133 is elapsed (YES in S44), the end determining unit 115 ends the comparison process.

As a result, the information processing device 1 can acquire the stable image corresponding to the respective screens more accurately. Specifically, for example, even in a case where there is the screen that is difficult to determine whether convergence occurs, such as a screen in which a part of the screen continues to change even after convergence, the information processing device 1 can accurately acquire the stable image corresponding to each screen.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium for storing a comparison program, the comparison program causing a processor to execute a process, the process comprising:
   acquiring a plurality of images sequentially displayed on a display unit according to a display instruction regarding a specific content, the plurality of images including a first image and a second image acquired after acquiring the first image;
   with the second image having a similarity with the first image that satisfies a criterion, performing a first comparison that includes comparing a reference image associated with the display instruction with at least one of the first image and the second image; and
   outputting a result of the first comparison,
   wherein the plurality of images further includes a third image acquired after acquiring the second image,
   wherein the process further comprises:
      with the third image having the similarity with the second image that satisfies the criterion, performing a second comparison that includes comparing the reference image associated with the display instruction with at least one of the first image, the second image, and the third image; and
      outputting a result of the second comparison.

2. The non-transitory computer-readable storage medium according to claim 1,
   wherein the criterion includes the second image having the similarity with the first image being equal to or greater than a predetermined threshold value.

3. The non-transitory computer-readable storage medium according to claim 1,
   wherein the second image is an image acquired immediately after the first image.

4. The non-transitory computer-readable storage medium according to claim 1,
   wherein in the outputting, in a case where it is not detected that the second image is acquired between a start of acquiring and an elapse of a predetermined time, the output of the comparison result is not performed.

5. The non-transitory computer-readable storage medium according to claim 1,
   wherein the third image is an image acquired immediately after the second image.

6. The non-transitory computer-readable storage medium according to claim 1,
   wherein in the outputting, in a case where it is not detected that the third image is acquired between a start of acquiring and an elapse of a predetermined time, the output of the comparison result is not performed.

7. A comparison apparatus comprising:
   a memory configured to store instructions; and
   a processor configured to execute the instructions stored in the memory, the instructions causing the processor to execute a comparison process including:
      acquiring a plurality of images sequentially displayed on a display unit according to a display instruction regarding a specific content, the plurality of images including a first image and a second image acquired after acquiring the first image;
      with the second image having a similarity with the first image that satisfies a criterion, performing a first comparison that includes comparing a reference image associated with the display instruction with at least one of the first image and the second image; and
      outputting a result of the first comparison,
   wherein the plurality of images further includes a third image acquired after acquiring the second image,
   wherein the process further comprises:
      with the third image having the similarity with the second image that satisfies the criterion, performing a second comparison that includes comparing the reference image associated with the display instruction with at least one of the first image, the second image, and the third image
      outputting a result of the second comparison.

8. The comparison apparatus according to claim 7,
   wherein the criterion includes the second image having the similarity with the first image being equal to or greater than a predetermined threshold value.

9. The comparison apparatus according to claim 7,
wherein the second image is an image acquired immediately after the first image.

10. The comparison apparatus according to claim 7,
wherein in the outputting, in a case where it is not detected that the second image is acquired between a start of acquiring and an elapse of a predetermined time, the output of the comparison result is not performed.

11. The comparison apparatus according to claim 7,
wherein the third image is an image acquired immediately after the second image.

12. The comparison apparatus according to claim 7,
wherein in the outputting, in a case where it is not detected that the third image is acquired between a start of acquiring and an elapse of a predetermined time, the output of the comparison result is not performed.

* * * * *